US011163476B2

(12) United States Patent
Lyu et al.

(10) Patent No.: US 11,163,476 B2
(45) Date of Patent: Nov. 2, 2021

(54) DYNAMIC REBALANCING OF FREE SPACE BETWEEN STORAGE POOLS

(71) Applicant: International Business Machines Corporation, Armonk, NY (US)

(72) Inventors: Gang Lyu, Shanghai (CN); Hui Zhang, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 84 days.

(21) Appl. No.: 16/592,814

(22) Filed: Oct. 4, 2019

(65) Prior Publication Data

US 2021/0103399 A1   Apr. 8, 2021

(51) Int. Cl.
*G06F 3/06* (2006.01)

(52) U.S. Cl.
CPC .......... *G06F 3/0647* (2013.01); *G06F 3/0604* (2013.01); *G06F 3/0644* (2013.01); *G06F 3/0673* (2013.01)

(58) Field of Classification Search
None
See application file for complete search history.

(56) References Cited

U.S. PATENT DOCUMENTS

| 9,424,057 | B2 | 8/2016 | Emaru |
| 9,696,932 | B1 | 7/2017 | Fradkin et al. |
| 10,228,856 | B2 | 3/2019 | Krishnamurthy et al. |
| 10,810,054 | B1* | 10/2020 | Lerin .................... G06F 9/5083 |
| 2004/0044698 | A1* | 3/2004 | Ebata ..................... G06F 3/067 |
| 2011/0185139 | A1* | 7/2011 | Inoue .................... G06F 3/0644 |
| | | | 711/165 |

(Continued)

FOREIGN PATENT DOCUMENTS

| CN | 103150123 A | 6/2013 |
| CN | 103345430 A | 10/2013 |

(Continued)

OTHER PUBLICATIONS

Anonymous, "Storage System Level Resource Auto-rebalance", An IP.com Prior Art Database Technical Disclosure, IP.com No. IPCOM000239626D, IP.com Electronic Publication Date: Nov. 20, 2014, 8 pages.

(Continued)

*Primary Examiner* — Yaima Rigol
(74) *Attorney, Agent, or Firm* — Stosch Sabo

(57) ABSTRACT

Described are techniques for dynamic rebalancing in storage systems. The techniques including a method comprising calculating an estimated time to storage fullness for respective storage pools in a space balance group, the estimated time to storage fullness based on an allocation speed of the respective storage pools. The method further comprises classifying a first storage pool having a first estimated time to storage fullness below a migration time threshold as a first migration source storage pool. The method further comprises classifying a second storage pool having a second estimated time to storage fullness above the migration time threshold as a first migration target storage pool. The method further comprises rebalancing free space in the space balance group by migrating storage volumes from the first migration source storage pool to the first migration target storage pool.

20 Claims, 8 Drawing Sheets

(56) References Cited

U.S. PATENT DOCUMENTS

| | | | |
|---|---|---|---|
| 2012/0054306 A1 | 3/2012 | Vaghani et al. | |
| 2012/0151174 A1* | 6/2012 | Matsunaga | G06F 3/0607 |
| | | | 711/171 |
| 2013/0297905 A1* | 11/2013 | Yang | G06F 3/0632 |
| | | | 711/165 |
| 2014/0281330 A1* | 9/2014 | Baldwin | G06F 12/023 |
| | | | 711/170 |
| 2015/0193154 A1* | 7/2015 | Gong | G06F 3/0608 |
| | | | 711/103 |
| 2015/0242150 A1* | 8/2015 | Sorenson, III | G06F 3/065 |
| | | | 711/114 |
| 2016/0313921 A1* | 10/2016 | Kojima | G06F 3/0656 |
| 2019/0042609 A1 | 2/2019 | Senthilnathan et al. | |

FOREIGN PATENT DOCUMENTS

| | | |
|---|---|---|
| JP | 2011242840 A | 12/2011 |
| WO | 2017008571 A1 | 1/2017 |

OTHER PUBLICATIONS

Mell et al., "The NIST Definition of Cloud Computing", Recommendations of the National Institute of Standards and Technology, Sep. 2011, 7 pages.

* cited by examiner

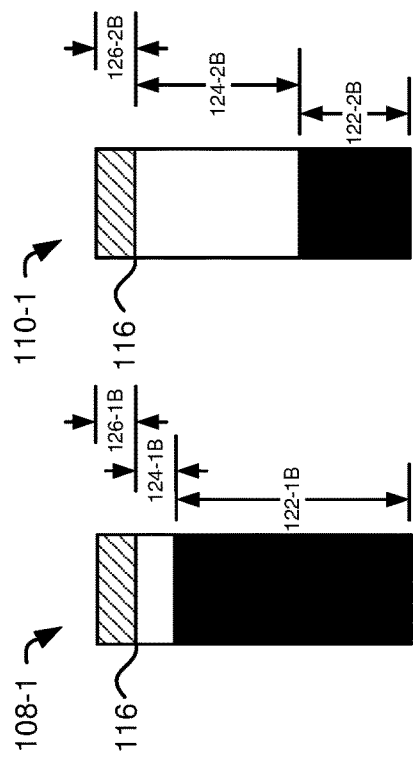
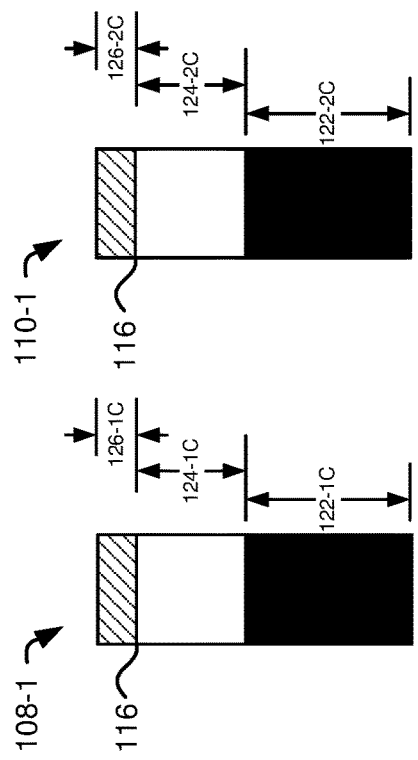
FIG. 1B
FIG. 1C
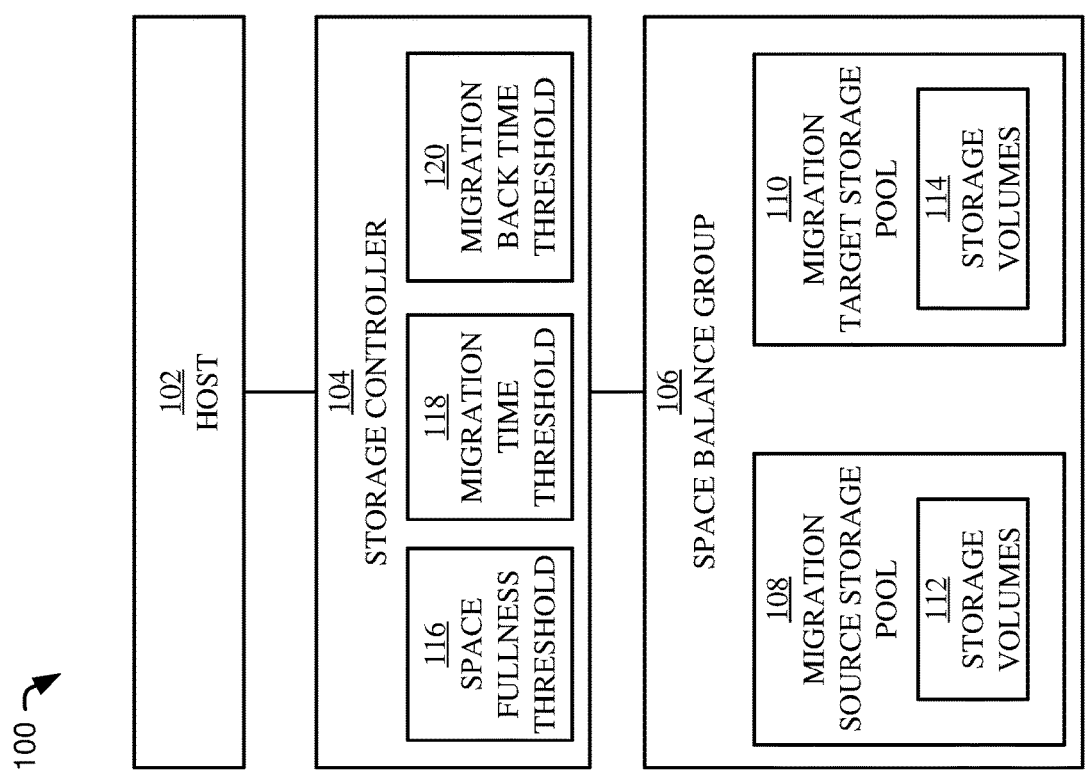
FIG. 1A

DYNAMIC REBALANCING OF FREE SPACE BETWEEN STORAGE POOLS

BACKGROUND

The present disclosure relates to data storage, and, more specifically, to dynamically rebalancing free space between storage pools.

Data storage is the recording of information in a storage medium using, for example, magnetic tape, disk drives (e.g., floppy disk drives, optical disk drives, hard disk drives, etc.), flash drives, portable storage devices, solid-state memory devices, and the like. Physical storage resources can be combined in arrays for enterprise use or public use such as network attached storage (NAS) arrays, storage area network (SAN) arrays, virtualized storage, and the like.

SUMMARY

Aspects of the present disclosure are directed toward a method comprising calculating an estimated time to storage fullness for respective storage pools in a space balance group, the estimated time to storage fullness based on an allocation speed of the respective storage pools. The method further comprises classifying a first storage pool having a first estimated time to storage fullness below a migration time threshold as a first migration source storage pool. The method further comprises classifying a second storage pool having a second estimated time to storage fullness above the migration time threshold as a first migration target storage pool. The method further comprises rebalancing free space in the space balance group by migrating storage volumes from the first migration source storage pool to the first migration target storage pools.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 1A illustrates a block diagram of an example storage system, in accordance with some embodiments of the present disclosure.

FIG. 1B illustrates a diagram of example storage pools prior to rebalancing, in accordance with some embodiments of the present disclosure.

FIG. 1C illustrates a diagram of example storage pools after rebalancing, in accordance with some embodiments of the present disclosure.

Figure 2:
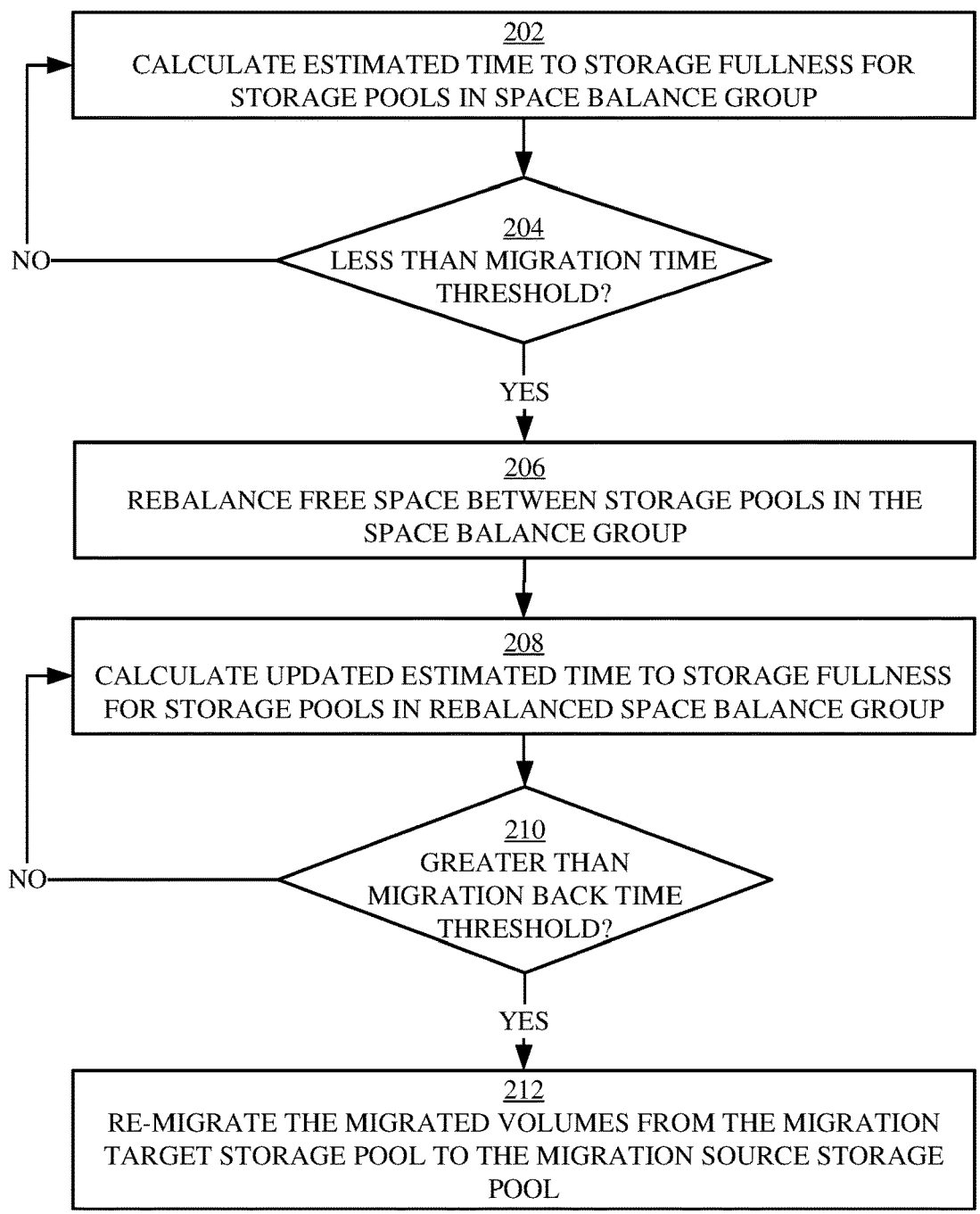
FIG. 2 illustrates a flowchart of an example method for rebalancing free space in a storage system, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward data storage, and, more specifically, to dynamically rebalancing free space between storage pools. While not limited to such applications, embodiments of the present disclosure may be better understood in light of the aforementioned context.

FIG. 1A illustrates an example storage system 100, in accordance with some embodiments of the present disclosure. Storage system 100 can include a host 102, a storage controller 104, and a space balance group 106. Storage controller 104 can be configured to manage storage resources in the space balance group 106 and/or provision storage resources to host 102. Space balance group 106 can be made up of a plurality of storage pools such as a migration source storage pool 108 (with associated storage volumes 112) and a migration target storage pool 110 (with associated storage volumes 114). Storage volumes 112, 114 can be virtualized storage volumes or physical storage volumes. In some embodiments, each storage volume is a thinly-provisioned storage volume.

The storage pools in the space balance group 106 can be configured to share storage space using volume migration or other data transfer, backup, and/or redundancy techniques. In some embodiments, each storage pool can be defined as a logical construct used to aggregate extents from a set of ranks or redundant array of independent disks (RAID) storage arrays to form a domain for extent allocation to a logical volume. Example storage architectures can include DS8000® (a registered trademark of International Business Machines Corporation), or a different storage architecture.

In accordance with embodiments of the present disclosure, storage controller 104 can be configured to rebalance free storage space between storage pools in the space balance group 106. Rebalancing free storage space is useful for improving storage performance of the storage system 100 and/or improving usability at host 102 (e.g., reducing storage errors, reducing latency, increasing reliability, etc.). For example, rebalancing free space between storage pools in space balance group 106 can improve storage space utilization in the storage system 100. Improving storage space utilization can have both economic benefits and performance benefits: economic benefits insofar as purchased storage space is used effectively and performance benefits insofar as balanced storage space utilization reduces storage-related errors by maintaining storage volumes within appropriate operating limits.

In order to properly monitor and trigger the rebalancing techniques discussed herein, the storage controller 104 can utilize a space fullness threshold 116, a migration time threshold 118, and a migration back time threshold 120. The space fullness threshold 116 can indicate an amount of storage (or a utilization level, such as a percentage) at which a storage volume is considered full. The migration time threshold 118 is a threshold related to an estimated amount of time for a storage pool to reach the space fullness threshold 116. If the estimated time to reach fullness is less than the migration time threshold 118, then the rebalancing process can be triggered. The migration back time threshold 120 is a threshold related to an estimated amount of time for migration source storage pool 108 (e.g., after an initial rebalancing process) to reach the space fullness threshold 116. If the estimated time to reach fullness for the migration source storage pool 108 is more than the migration back time threshold 120, then the migrated volumes can be returned to their original position (e.g., migrated back to the migration source storage pool 108 from the migration target storage pool 110. In some embodiments, the migration time threshold 118 is less than the migration back time threshold 120.

FIG. 1A is shown for representative purposes and is not to be construed as limiting. For example, in many real-world applications, numerous hosts 102 are coupled to numerous storage controllers 104 which are each coupled to numerous space balance groups 106. Thus, for the purposes of clearly illustrating some aspects of the present disclosure, FIG. 1A is a simplified representation of a real-world system that is provided to illustrate, at a high level, some aspects of the present disclosure.

FIGS. 1B and 1C are shown to better illustrate some aspects of the present disclosure. FIG. 1B illustrates a representative first migration source storage pool 108-1 and a representative first migration target storage pool 110-1 at a pre-rebalancing time (e.g., prior to rebalancing operations). Representative first migration source storage pool 108-1 includes an amount of used (e.g., allocated) space 122-1B, an amount of free space 124-1B, and an amount of reserved space 126-1B, where the transition between the remaining free space 124-1B and the reserved space 126-1B can comprise the space fullness threshold 116. Likewise, representative first target storage pool 110-1 includes an amount of used space 122-2B, an amount of free space 124-2B, and an amount of reserved space 126-2B.

As shown in FIG. 1B, the amount of free space 124-1B in the representative first migration source storage pool 108-1 is less than the amount of free space 124-2B in the representative first migration target storage pool 110-1. This results in asymmetric storage space utilization between storage pools in storage system 100. Such asymmetric storage space utilization can reduce performance and/or decrease efficiency in the storage system 100.

FIG. 1C illustrates the representative first migration source storage pool 108-1 and the representative first migration target storage pool 110-1 at a post-rebalancing time after the storage pools have been rebalanced in accordance with some embodiments of the present disclosure. As shown in FIG. 1C, representative first migration source storage pool 108-1 includes an amount of used space 122-1C, an amount of free space 124-1C, and an amount of reserved space 126-1C. Likewise, representative first migration target storage pool 110-1 includes an amount of used space 122-2C, an amount of free space 124-2C, and an amount of reserved space 126-2C.

As shown in FIG. 1C, the amount of free space 124-1C in representative first migration source storage pool 108-1 is approximately equal to the amount of free space 124-2C in representative first migration target storage pool 110-1 as a result of the rebalancing performed in accordance with some embodiments of the present disclosure. This rebalancing causes a portion of the used space 122-1B (shown in FIG. 1B) in representative first migration source storage pool 108-1 to be transferred to the free space 124-2B (shown in FIG. 1B) in representative first migration target storage pool 110-1. However, it should be noted that although aspects of the present disclosure are used to approximately equalize the amount of free space between storage pools (or equalize the percentage of free space in storage pools of different sizes), rebalancing can have other purposes and outcomes. As one example, the data can be rebalanced according to an estimated allocation speed of the various storage pools, where storage pools with a higher allocation speed can be rebalanced to have proportionally more free space than storage pools with a relatively lower allocation speed. This is just one alternative example, of many, some of which will be discussed in more detail below.

Thus, FIGS. 1A-1C illustrate an implementation environment and example outcomes of storage rebalancing consistent with some embodiments of the present disclosure. The following flowcharts discuss in more detail the particular techniques, equations, and processes used to effectively rebalance free space between storage pools in a storage system 100.

FIG. 2 illustrates a flowchart of a generalized method 200 for rebalancing free space in a space balance group 106, in accordance with some embodiments of the present disclosure. In some embodiments, the method 200 can be implemented by a storage controller 104 or a different configuration of hardware and/or software. In some embodiments, the method 200 is a simplified version of the methods 300-500 discussed in more detail below with respect to FIGS. 3-5.

Operation 202 includes calculating an estimated time to storage fullness for storage pools in a space balance group 106. In some embodiments, the estimated time to storage fullness is based on an estimated allocation speed of respective storage pools in the space balance group 106. In some embodiments, the estimated time to storage fullness includes (1) calculating an amount of free space in a storage pool by subtracting an allocated space from a space fullness threshold 116, (2) calculating an allocation speed for each storage pool using, for example, Exponential Moving Average (EMA) techniques or other techniques, and (3) calculating the time to storage fullness by dividing the amount of free space by the allocation speed for each storage pool.

In some embodiments, operation 202 occurs at the storage volume level within each storage pool, where the sum, average, or minimum time to storage fullness for the storage volumes within the storage pool can be used as the estimated time to storage fullness for the storage pool.

Operation 204 includes determining if the estimated time to storage fullness for any storage pool in the space balance group 106 is less than (or less than or equal to) the migration time threshold 118. If not (204: NO), then the method 200 returns to operation 202 and intermittently calculates the estimated time to storage fullness for storage pools in the space balance group 106. If so (204: YES), the method 200 proceeds to operation 206. Although not explicitly shown, operation 204 can include classifying each storage pool in the space balance group 106 as a migration source storage pool 108 or a migration target storage pool 110, where the migration source storage pool(s) 108 have an estimated time to fullness less than (or less than or equal to) the migration time threshold 118, and where the migration target storage pool(s) 110 have an estimated time to fullness of more than (or more than or equal to) the migration time threshold 118.

Operation 206 includes rebalancing free space between storage pools in the space balance group 106 to generate a rebalanced space balance group 106. Operation 206 can include migrating storage volumes from a migration source storage pool 108 to a migration target storage pool 110. The rebalancing protocol can take various forms in various embodiments. As one example, each storage pool in the rebalanced space balance group 106 can include an approximately equal amount (or percentage) of free storage space. As another example, storage pools in the rebalanced space balance group 106 can have an amount of free space that is proportional to the allocation speed of each storage pool. In this example, although the amount of free space is unequal between storage pools, the amount of time until storage fullness for each storage pool is approximately equal.

Although not explicitly shown, operations 208-212 can occur, if they occur at all, an increment of time after operations 202-206. For example, operation 208 can occur an interval of time less than, greater than, or equal to one day, one week, one month, or a different amount of time after operations 202-206. Further, although not explicitly shown, operations 202-206 can occur repeatedly causing the space balance group 106 to be rebalanced numerous times over a period of hours, days, weeks, or months.

Operation 208 includes calculating an updated estimated time to storage fullness for storage pools in the rebalanced space balance group 106. In some embodiments, calculating the updated estimated time to storage fullness utilizes similar techniques discussed above with respect to operation 202. In some embodiments, operation 208 calculates the updated estimated time to fullness for storage pools originally classified as migration source storage pools 108.

Operation 210 includes determining if the updated time to storage fullness for a previously classified migration source storage pool 108 is greater than (or greater than or equal to) the migration back time threshold 120. If not (210: NO), the method 200 returns to operation 208. If so (210: YES), the method 200 proceeds to operation 212.

Operation 212 includes re-migrating the migrated storage volumes from the migration target storage pool 110 to the migration source storage pool 108 for any migration source storage pool 108 that has an estimated time to fullness greater than (or greater than or equal to) the migration back time threshold 120. Re-migrating storage volumes back to their original location can be useful for various reasons including data administration, data organization, data consolidation, storage efficiency, auditing, security policy enforcement, privacy policy enforcement, and/or other factors and considerations.

Figure 3:
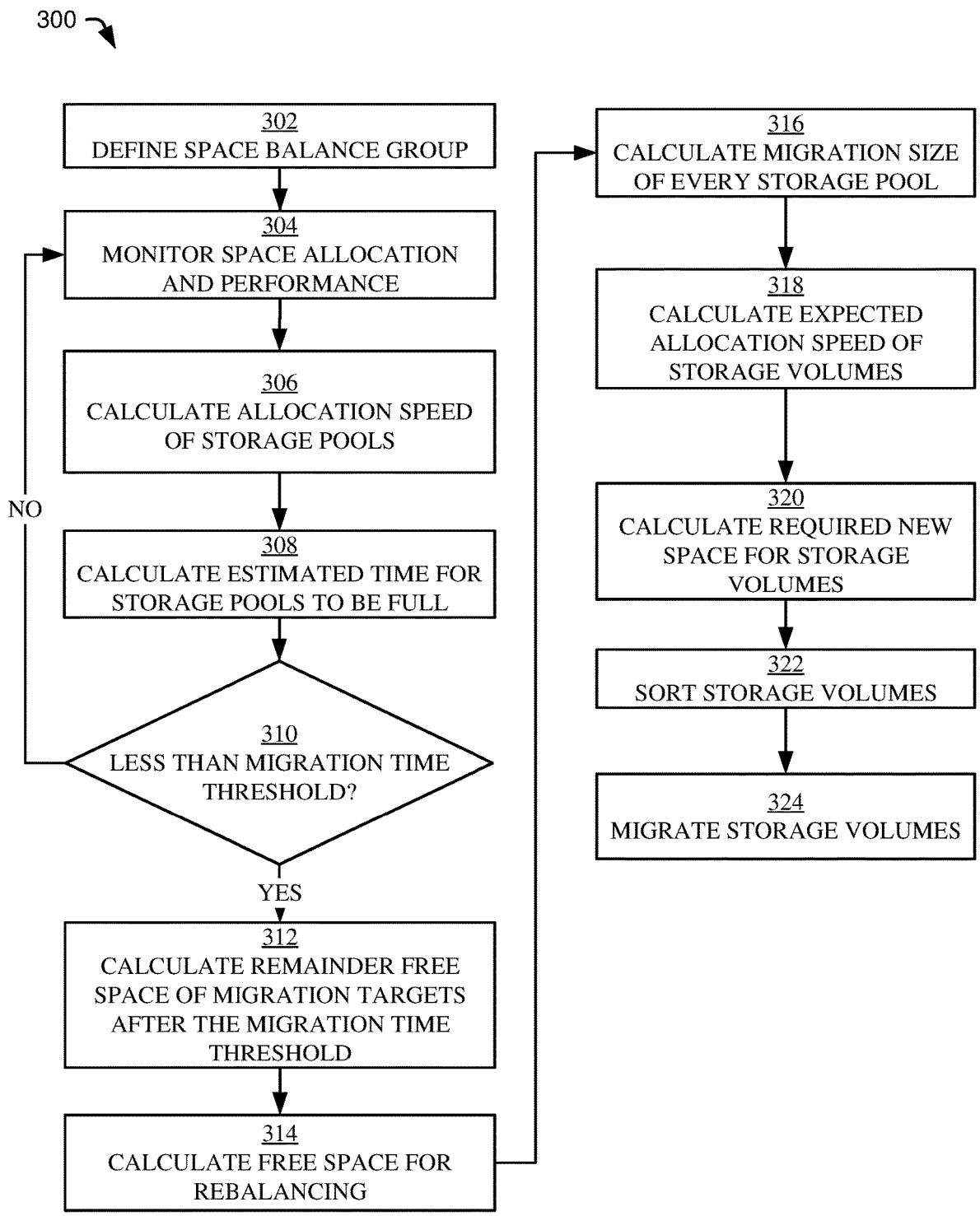
FIG. 3 illustrates a flowchart of an example method for rebalancing free space from a migration source storage pool to a migration target storage pool, in accordance with some embodiments of the present disclosure.

Referring now to FIG. 3, illustrated is a flowchart of an example method 300 for volume migration from a migration source storage pool 108 to migration target storage pool 110, in accordance with some embodiments of the present disclosure. In some embodiments, the method 300 is implemented by a storage controller 104, or a different configuration of hardware and/or software.

Operation 302 includes defining a space balance group 106, where the space balance group 106 includes a plurality of storage pools. In some embodiments, multiple space balance groups 106 can be created. In some embodiments, operation 302 also includes defining a space fullness threshold 116 and/or a migration time threshold 118 for each storage pool in the space balance group 106. The space fullness threshold 116 can be a threshold related to an allowable fullness of a storage pool in a space balance group 106. In other words, if the space allocation of a storage pool reaches the space fullness threshold 116, no new extent can be allocated to the volumes in that storage pool. If the volumes in the storage pool work as the secondary volume of a remote copy, then the remote copy can be suspended. If the volumes in the storage pool are attached to the host 102, then host 102 access to those volumes may be lost. The migration time threshold 118 can define a time threshold at which embodiments of the present disclosure are configured to initiate rebalancing of free space by volume migration between storage pools. In other words, if a storage pool takes the migration time threshold 118 (or less) to reach the space fullness threshold 116 (as calculated using an estimated allocation speed for a storage pool), then free space rebalancing is triggered.

Other thresholds can be used to trigger the start of volume migration for free space rebalancing between storage pools such as a threshold based on the fullness percentage of a storage pool. In this alternative example, if the fullness percentage of a storage pool exceeds the threshold based on the fullness percentage of the storage pool, then the volume migration is triggered.

In various embodiments, the space fullness threshold 116 and/or the migration time threshold 118 are defined based on user input. In some embodiments, the space fullness threshold 116 and/or the migration time threshold 118 are defined according to product specifications, machine learning insights, or other predefined or automated determinations. Further, although a single space fullness threshold 116 is shown, in some embodiments, numerous space thresholds 116 for different types, classifications, or applications of particular storage pools are defined. Likewise, although a single migration time threshold 118 is shown, in some embodiments, different migration time thresholds 118 can be used for different types, classifications, or applications of particular storage pools. As one example, in a tiered storage system, there can be different migration time thresholds 118 for different tiers of the tiered storage system.

Operation 304 includes monitoring space allocation in each storage pool of the space balance group 106. Operation 304 can be performed utilizing known storage architecture management techniques to identify amounts of used space, reserved space, and/or free space within each storage pool. In some embodiments, operation 304 also monitors performance of storage pools, where deteriorations in performance can indirectly indicate inadequate free space remaining in a given storage pool.

Operation 306 includes calculating a storage pool allocation speed for respective storage pools in the space balance group 106. The storage pool allocation speed can be calculated using an EMA method or a different method. In some embodiments, EMA of a storage pool can be defined according to Equation 1:

$$\text{EMA\_new} = (1-\alpha)\text{EMA\_old} + \alpha(\text{Data\_new}) \quad \text{Equation 1:}$$

As shown in Equation 1, the new EMA (EMA_new) can be based on the old EMA of historical allocation speed data (EMA_old) multiplied by $(1-\alpha)$ and added to a term of alpha ($\alpha$) multiplied by the newest data point (or average of a newer set of data points) related to allocation speed (Data_new). In the present disclosure, the EMA_new, EMA_old, and Data_new terms can have units of allocated size per interval of time, where allocated size can be in units of bits, bytes, kilobytes, megabytes, gigabytes, terabytes, or a different allocation size metric, and where the interval of time can be any interval of time such as, but not limited to, 24 hours, 7 days, or a different interval of time. Alpha (a) can be any variable between 0 and 1 that is configured to appropriately bias the EMA_new value toward the Data_new value. As can be seen from Equation 1, EMA is advantageous for lending higher weight to newer data points compared to older data points. Thus, EMA can be useful to reflect accelerating or decelerating trends in data allocation speed.

Operation 308 includes determining an amount of time until a storage pool reaches a space fullness threshold 116 based on the storage pool allocation speed determined in operation 306 and an amount of free space in the storage pool. Operation 308 can utilize Equation 2:

$$\text{Time to Fullness} = \frac{\text{Space\_fullness\_threshold} - \text{Current\_allocated\_space}}{\text{Storage\_Pool\_Allocation\_Speed}} \quad \text{Equation 2}$$

As shown in Equation 2, the time to fullness for a given storage pool can be calculated by subtracting a current allocated space for the storage pool from a space fullness threshold (to determine an amount of free space). This result can be divided by the storage pool allocation speed determined using EMA or a different mathematical technique discussed above with respect to operation 306.

Operation 310 can determine if the time to fullness calculated in operation 308 for any one of the storage pools in the space balance group 106 satisfies (e.g., is less than, is less than or equal to, etc.) the migration time threshold 118. If not (210: NO), the method 300 returns to operation 304 and continues monitoring the space allocation of storage pools in the space balance group 106. If so (210: YES), the method 300 proceeds to operation 312.

Although not explicitly shown, operation 310 can include classifying each storage pool as a migration source storage pool 108 or a migration target storage pool 110, where the migration source storage pools 108 include an estimated time to fullness below the migration time threshold 118, and where migration target storage pools 110 include an estimated time to fullness above the migration time threshold 118.

Operation 312 includes calculating a remainder of free space of one or more migration target storage pools 110 after the migration time threshold 118. Operation 312 can utilize Equations 3 and 4 to determine the remainder of free space of migration target storage pool 110 after the migration time threshold 118. First, Equation 3 can be used to determine the amount of space that will be converted from free space to allocated space as a result of normal operations on the migration target storage pool 110:

$$\text{Required\_Storage\_Pool\_Space} = (\text{Storage\_Pool\_Allocation\_Speed})(\text{Migration\_Time\_Threshold}) \quad \text{Equation 3:}$$

As shown in Equation 3, the required storage pool space that will be converted from free space to allocated space during the migration time threshold 118 at the migration target storage pool 110 can be calculated by multiplying the migration target storage pool 110 allocation speed by the migration time threshold 118. Equation 4 can use this information to determine the free space remaining in the migration target storage pool 110 after the migration time threshold 118:

$$\text{Remainder\_Storage\_Pool\_Free\_Space} = (\text{Space\_Fullness\_Threshold}) - (\text{Current\_Allocated\_Space}) - (\text{Required\_Storage\_Pool\_Space}) \quad \text{Equation 4:}$$

As shown in Equation 4, the remainder storage pool free space in the migration target storage pool 110 can be calculated by subtracting the required storage pool space (as calculated in Equation 3) and the current allocated space from the space fullness threshold 116 of the migration target storage pool 110.

Operation 314 includes calculating an amount of total free space for each storage pool in the space balance group 106 after the migration time threshold 118. This can be used to determine the total amount of free space in the space balance group 106 that is available for rebalancing. For simplification, operation 314 can assume that every migration source storage pool 108 includes zero free space after the migration time threshold 118 and approximates the remaining free space in each migration target storage pool 110 based on the allocation speeds for the migration target storage pools 110 calculated in operation 306. Operation 314 can utilize Equation 5:

$$\text{Rebalanced\_Free\_Space} = \frac{\text{sum}(\text{Remainder\_Storage\_Pool\_Free\_Space})}{\text{Number\_of\_Storage\_Pools}} \quad \text{Equation 5}$$

Equation 5 can include dividing the sum of the remainder storage pool free space (calculated using Equation 4) for each migration target storage pool 110 by the number of storage pools in the space balance group 106. Thus, Equation 5 calculates an even redistribution of free space amongst all storage pools in the space balance group 106.

The even redistribution of free space amongst storage pools in the space balance group 106 discussed above with respect to operation 314 is one of many possible redistribution strategies contemplated in the present disclosure. Several alternatives are listed below that include, but are not limited to:

(i) The storage pool free space can be evenly distributed amongst each storage pool in the space balance group. In other words, each storage pool can have an equal amount of free space or an equal percentage of free space;

(ii) The storage pool free space can be preferentially distributed to the migration target storage pool(s) 110 compared to the migration source storage pool(s) 108. In other words, migration target storage pools 110 can have a higher amount (or percentage) of free space compared to the migration source storage pools 108;

(iii) The storage pool free space can be preferentially distributed to the migration source storage pool(s) 108 compared to the migration target storage pool(s) 110. In other words, migration source storage pools 108 can have a higher amount (or percentage) of free space compared to the migration target storage pools 110;

(iv) The storage pool free space can be distributed amongst each storage pool in the space balance group 106 proportionate to the size of each storage pool in the space balance group 106 (e.g., where larger storage pools receive a proportionately larger amount of free space and smaller storage pools receive a proportionately smaller amount of free space). In other words, a first ratio of free space in a first storage pool divided by free space in a second storage pool equals a second ratio of a first total size of the first storage pool divided by a second total size of the second storage pool;

(v) The storage pool free space can be distributed amongst the storage pools in the space balance group 106 as a function of the storage pool allocation speed (e.g., where storage pools with a higher allocation speed can receive relatively more free space compared to storage pools having a relatively lower storage pool allocation speed). In other words, a first ratio of free space in a first storage pool divided by free space in a second storage pool equals a second ratio of a first allocation speed of the first storage pool divided by a second allocation speed of the second storage pool.

Operation 316 includes calculating a migration size into (e.g., to migration target storage pool 110) or out of (e.g., from migration source storage pool 108) for every storage pool in the space balance group 106. In some embodiments, this means that for every migration source storage pool 108, the amount of data that is to be migrated out is equal to the planned storage pool free space (see Equation 5) for that storage pool (e.g., as this is the amount of allocated space that needs to be migrated to achieve the desired amount of free space). Meanwhile, for every migration target storage pool 110, the amount of free space that is allocated to data migrated from the migration source storage pools 108 is the remainder storage pool free space (see Equation 4) for a given migration target storage pool 110 minus the planned storage pool free space (see Equation 5) for the given migration target storage pool 110.

Operations 318-322 can be useful for sequencing which storage volumes to migration from a migration source storage pool 108 to a migration target storage pool 110. Operations 318-322 exhibit only one of several possible ways that free space can be redistributed amongst individual storage pools.

Operation 318 includes calculating an expected future allocation speed of every storage volume within a migration source storage pool 108. As discussed with respect to operation 306, operation 318 can utilize EMA as one of many possible methods for calculating expected future allocation speeds (e.g., see Equation 1).

Operation 320 includes calculating a required new space for every storage volume in a migration source storage pool 108. Operation 320 can utilize Equation 6:

$$\text{Required\_Volume\_Space} = (\text{Volume\_Allocation\_Speed})(\text{Time\_to\_Full}) \quad \text{Equation 6:}$$

As shown above, Equation 6 can determine the required volume space for a given storage volume by multiplying the volume allocation speed for the given volume (e.g., see Equation 1 and operation 318) by the time to space fullness (e.g., see Equation 2 and operation 308).

Operation 322 can sort the volumes according to the required volume space (e.g., as determined in operation 320 using, for example, Equation 6). Operation 322 can sort the volumes in ascending or descending order, in various embodiments.

Operation 324 includes migrating storage volumes from the migration source storage pool 108 and the migration target storage pool 110 in the space balance group 106. In some embodiments, the storage volumes can be migrated in the order defined in operation 322. Operation 324 is discussed in more detail hereafter with respect to FIG. 4.

Although not explicitly shown, the method 300 can return to operation 304 and continue monitoring space allocation and/or performance of storage pools in the space balance group 106 with the migrated data. In such embodiments, the method 300 can iterate through operations 304-324 and continue re-balancing free space across the storage pools in the space balance group 106.

Figure 4:
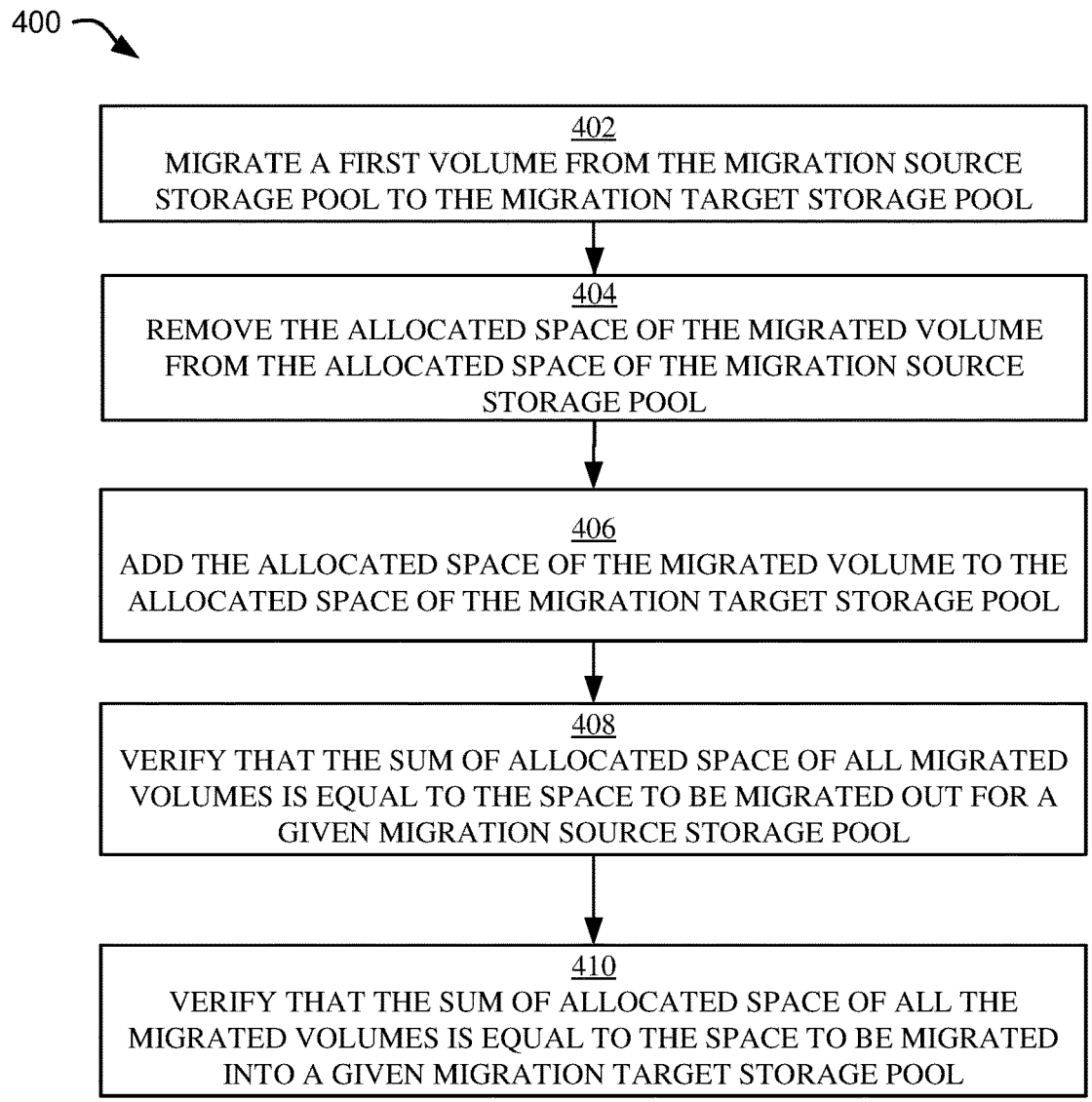
FIG. 4 illustrates a flowchart of an example method for migrating storage volumes, in accordance with some embodiments of the present disclosure.

FIG. 4 illustrates a flowchart of an example method 400 for migrating storage volumes, in accordance with some embodiments of the present disclosure. In some embodiments, the method 400 is a sub-method of operation 324 of FIG. 3. The method 400 can be implemented by a storage controller 104 or a different configuration of hardware and/or software.

Operation 402 includes migrating a first volume from the migration source storage pool 108 to the migration target storage pool 110. Operation 404 includes removing the allocated volume space of the migrated first volume from the allocated space of the migration source storage pool 108 (thereby increasing the amount of free space in the migration source storage pool 108). Operation 406 includes adding the allocated volume space of the migrated first volume to the allocated space of the migration target storage pool 110 (thereby decreasing the free space in the migration target storage pool 110).

Operation 408 includes verifying that the sum of allocated space of all migrated volumes is equal to the space to be migrated out for a given migration source storage pool 108. In some embodiments, operation 408 utilizes Equation 7:

$$\text{sum(Required\_Volume\_Space)} = \text{Rebalanced\_Free\_Space} \quad \text{Equation 7:}$$

As shown in Equation 7, summing required volume space (see Equation 6) for each storage volume that is being migrated into the migration target storage pool 110 should equal the rebalanced free space (see Equation 5) representing the amount of data that is migrated out of the migration source storage pool 108.

Operation 410 includes verifying that the sum of allocated space of all the migrated volumes is equal to the space to be migrated into a given migration target storage pool 110. In some embodiments, operation 410 utilizes Equation 8:

$$\text{sum(Required\_Volume\_Space)} = \text{Remainder\_Storage\_Pool\_Free\_Space} - \text{Rebalanced\_Free\_Space} \quad \text{Equation 8:}$$

As shown in Equation 8, summing required volume space (see Equation 6) for each storage volume that is being migrated into the migration target storage pool 110 should equal the remainder storage pool free space (see Equation 4) minus the rebalanced free space (see Equation 5) for the migration target storage pool 110.

Figure 5:
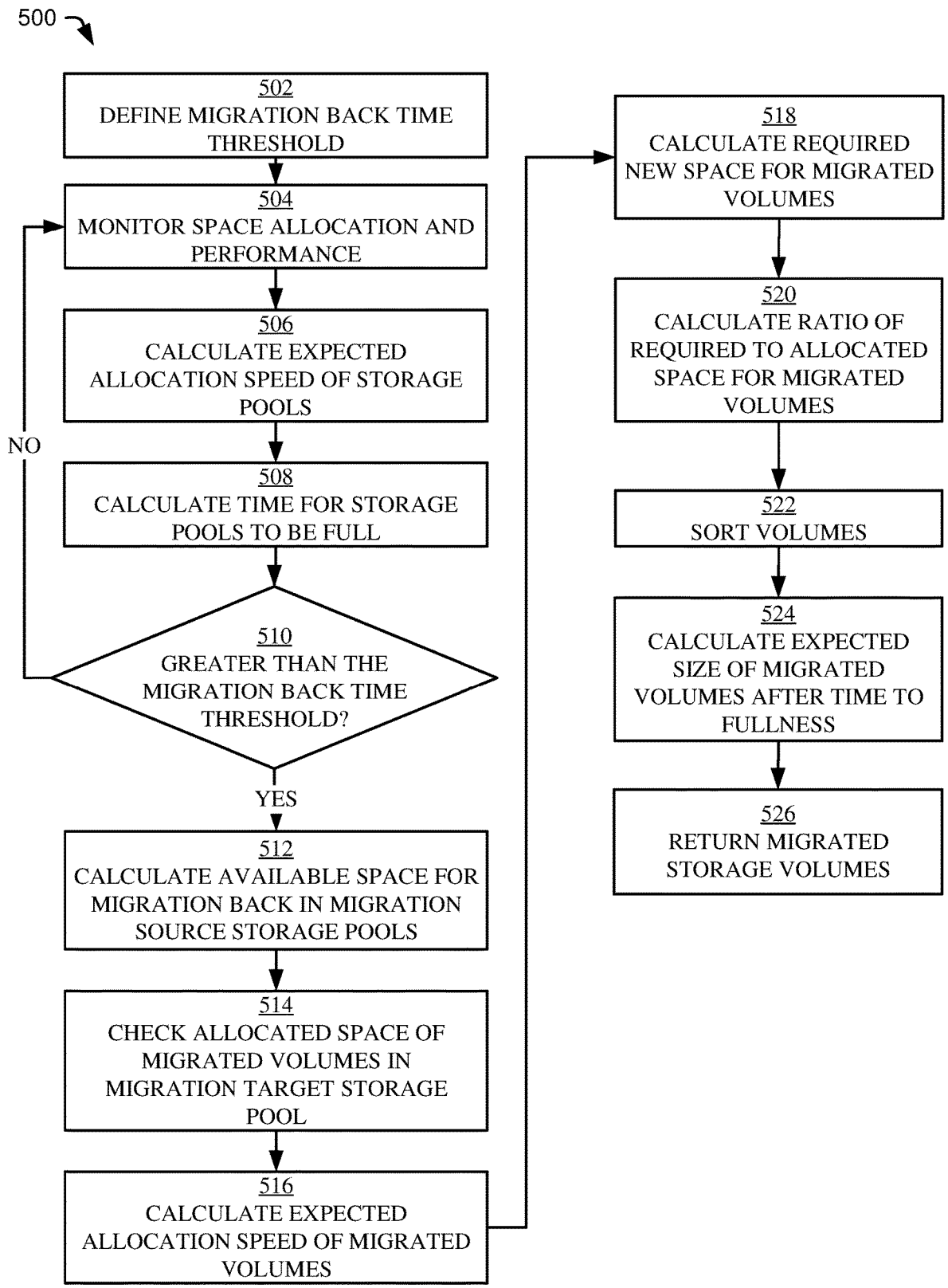
FIG. 5 illustrates a flowchart of an example method for returning a migrated volume from a migration target storage pool to a migration source storage pool, in accordance with some embodiments of the present disclosure.

FIG. 5 illustrates a flowchart of an example method 500 for performing volume migration back from the migration target storage pool 110 to the migration source storage pool 108, in accordance with some embodiments of the present disclosure. In some embodiments, the method 500 occurs after the method 200 and provides a mechanism for returning migrated volumes from a migration target storage pool 110 to their original position in a migration source storage pool 108. In some embodiments, the method 500 can be implemented by a storage controller 104 or a different configuration of hardware and/or software.

Operation 502 includes defining a migration back time threshold 120. The migration back time threshold 120 can refer to a time threshold for triggering migrated volumes from a migration target storage pool 110 to be returned to their original position in a migration source storage pool 108. For a given storage pool with an expected allocation speed, if a migration source storage pool 108 takes equal to or greater than the migration back time threshold 120 to reach the space fullness threshold 116, then a migrated volume can be returned to the migration source storage pool 108 from a migration target storage pool 110.

Operation 504 includes monitoring space allocation and/or performance of the storage pools in the space balance group 106. In some embodiments, operation 504 is consistent with operation 304 of FIG. 3.

Operation 506 includes calculating an expected allocation speed of respective storage pools in the space balance group 106 using, for example, EMA techniques as discussed with respect to Equation 1. In some embodiments, operation 506 is consistent with operation 306 of FIG. 3.

Operation 508 includes calculating an estimated time for respective storage pools to reach the space fullness threshold 116. In some embodiments, operation 508 is consistent with operation 308 of FIG. 3. Further, operation 508 can utilize Equation 2. In some embodiments, operations 506 and 508 occur for storage pools originally classified as migration source storage pools 108.

Operation 510 determines if the estimated time to fullness for any one of the migration source storage pools 108 is greater than (or equal to or greater than) the migration back time threshold 120. The migration back time threshold 120 can be used to trigger a re-migration process for returning migrated storage volumes from a migration target storage pool 110 to the migration source storage pool 108. In some embodiments, the migration back time threshold 120 overrides the migration time threshold 118 discussed with respect to operation 310 of FIG. 3. In other words, regardless of whether or not a given migration target storage volume 110 satisfies the migration time threshold 118, returning migrated volumes can occur if the migration source storage pool 108 satisfies the migration back time threshold 120. If the time to fullness for any migration source storage pool 108 satisfies (e.g., is greater than, is greater than or equal to, etc.) the migration back time threshold 120 (510: YES), then the method 500 proceeds to operation 512. If not (510: NO), the method 500 returns to operation 504.

Operation 512 includes calculating the available space which can be used to return migrated storage volumes back for a given migration source storage pool 108. In some embodiments, operation 512 can utilize Equation 9:

Free_Migration_Back_Storage_Pool_Space=Space_Fullness_Threshold−Current_Allocated_Space−Buffer_Space    Equation 9:

As shown in Equation 9, the free migration back storage pool space can be equal to the space fullness threshold minus the current allocated space and minus the buffer space. The buffer space can be a configurable amount of storage space configured to reduce risks associated with overusing or overprovisioning a storage resource.

Operation 514 includes checking allocated space of migrated volumes in the migration target storage pool 110. This is useful insofar as the migrated volumes may have increased or decreased in size since they were migrated to the migration target storage pool 110 from the migration source storage pool 108.

Operation 516 includes calculating expected allocation speeds of the migrated volumes. Operation 516 can utilize EMA to calculate the expected allocation speed. In some embodiments, operation 516 can utilize Equation 1. In some embodiments, operation 516 is consistent with operation 318 of FIG. 3.

Operation 518 includes calculating a required new space for migrated volumes returned from the migration target storage pool 110 to the migration source storage pool 108. In some embodiments, operation 518 can utilize Equation 10:

Required_Volume_Space=(Volume_Allocation_Speed)*(Time_to_Space_Fullness)    Equation 10:

As shown above, Equation 10 can determine the required volume space by multiplying a volume allocation speed with a time to space fullness value. In some embodiments, operation 518 is consistent with operation 320 of FIG. 3.

Operation 520 includes calculating a ratio of required to allocated space for migrated volumes. Operation 520 can utilize Equation 11:

$$\text{Ratio} = \frac{\text{Required\_Volume\_Space}}{\text{Allocated\_Volume\_Space\_in\_Target}} \quad \text{Equation 11}$$

As shown in Equation 11, the ratio can be determined by dividing the required volume space (e.g., as determined Equation 10) by the allocated volume space in the migration target storage pool 110.

Operation 522 includes sorting the storage volumes according to the ratio determined in operation 520. In various embodiments, operation 522 can sort the volumes in ascending order, descending order, or another numeric order.

Operation 524 includes calculating an expected size of the migrated volumes after time to fullness for each volume. Operation 524 can utilize Equation 12:

Expected_Volume_Space=Allocated_Volume_Space_in_target+Required_Volume_Space    Equation 12:

As shown in Equation 12, the expected volume space can be determined by adding the allocated volume space in the migration target storage pool 110 to the required volume space (e.g., as determined using Equation 10).

Operation 526 can include returning one or more migrated storage volumes from the migration target storage pool 110 to the migration source storage pool 108. In some embodiments, storage volumes are migrated according to the sorted list generated in operation 522.

In some embodiments, operation 526 includes, for a first storage volume that is migrated back from the migration target storage pool 110 to the migration source storage pool 108, removing the expected volume space of the volume from the migration target storage pool 110 and adding the expected volume space of the back-migrated storage volume to the migration source storage pool 108. Operation 526 can also ensure that the sum of expected volume spaces of all the re-migrated volumes is equal to or less than the available space to be used for back-migrations in the migration source storage pool 108.

In light of the previous discussion, it is clear that aspects of the present disclosure realize a variety of advantages and improvements to data storage systems including, but not limited to:

(1) improved storage system utilization, efficiency, and reliability insofar as free space is strategically redistributed between storage pools to improve storage system performance;

(2) improved free space redistribution insofar as determinations related to storage space resource consumption are calculated based on Exponential Moving Averages (EMA), where the EMA techniques accurately convey trends in data (e.g., accelerating or decelerating storage resource consumption for certain storage pools);

(3) improved free space redistribution insofar as the redistribution technique can be configured to equalize free space (as an amount of storage space or a percentage of storage space) amongst all storage pools, proportionately distribute free space amongst storage pools based on storage pool size, proportionately distribute free space amongst storage pools based on storage pool allocation speed, etc.; and/or (4) improved data organization insofar as the present disclosure provides a mechanism for returning migrated volumes to their original storage pool once the original storage pool has sufficient resources to handle the returned migrated volumes.

Figure 6:
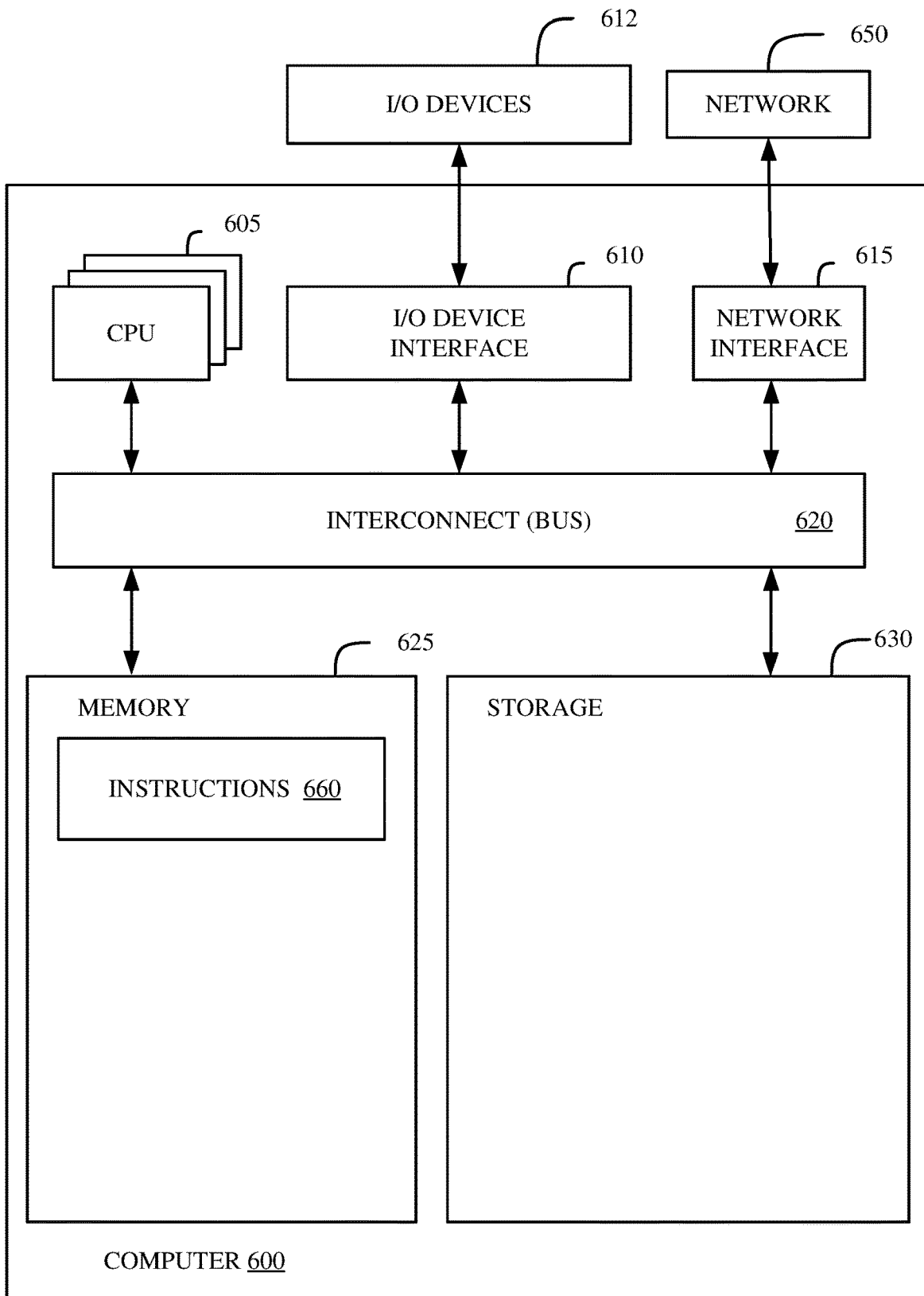
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform the methods described in FIGS. 2-5 and/or implement the functionality discussed in FIGS. 1A-1C. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine such that the client machine executes the method, or a portion of the method, based on the instructions provided by computer 600. In some embodiments, the computer 600 is incorporated into storage controller 104.

Computer 600 includes memory 625, storage 630, interconnect 620 (e.g., BUS), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more busses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be processor-executable instructions for performing any portion of, or all of, any of the methods of FIGS. 2-5 and/or implementing any of the functionality discussed in FIGS. 1A-1C.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
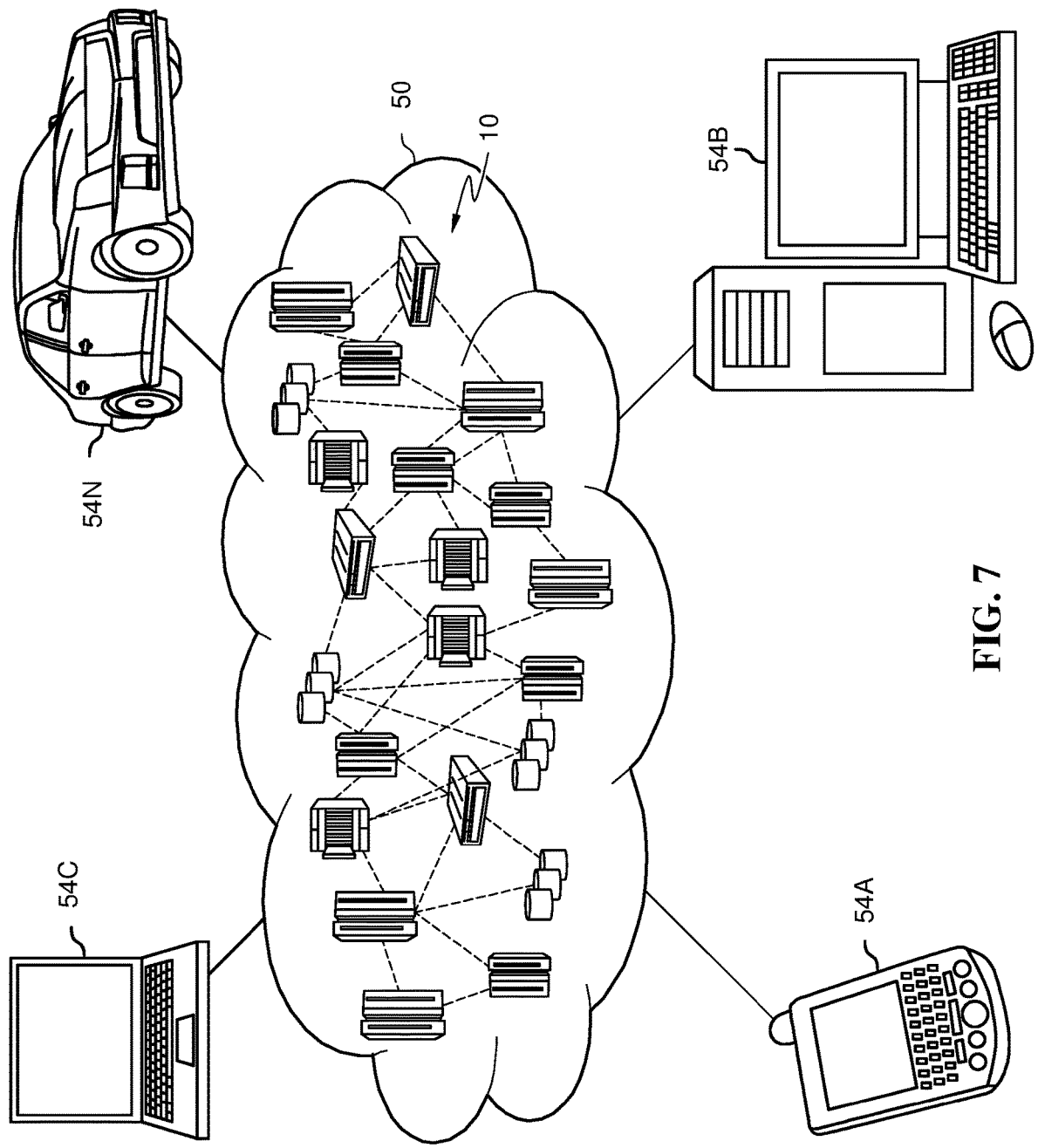
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
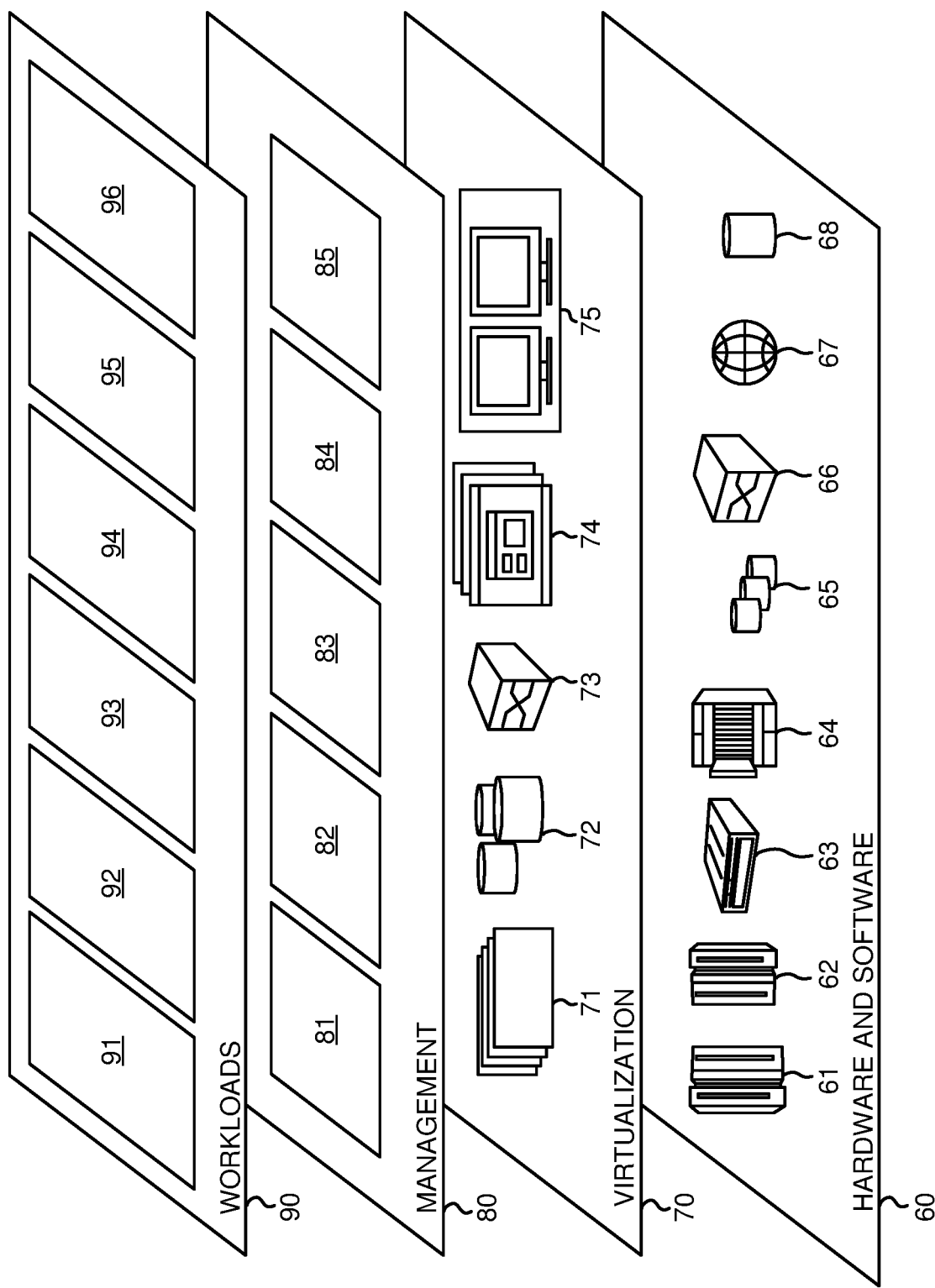
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic storage space rebalancing 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any subset of the methods described with respect to FIGS. 2-5 and/or any of the functionality discussed in FIGS. 1A-1C) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

Several examples will now be provided to further clarify various aspects of the present disclosure.

Example 1: A method comprising calculating an estimated time to storage fullness for respective storage pools in a space balance group, the estimated time to storage fullness based on an allocation speed of the respective storage pools. The method further comprises classifying a first storage pool having a first estimated time to storage fullness below a migration time threshold as a first migration source storage pool. The method further comprises classifying a second storage pool having a second estimated time to storage fullness above the migration time threshold as a first migration target storage pool. The method further comprises rebalancing free space in the space balance group by migrating storage volumes from the first migration source storage pool to the first migration target storage pools.

Example 2: The limitations of Example 1, wherein each storage pool comprises a respective plurality of thinly-provisioned storage volumes.

Example 3: The limitations of any one of Examples 1-2, wherein the first estimated time to storage fullness for the first storage pool is based on a first amount of free space in the first storage pool divided by a first allocation speed of the first storage pool.

Example 4: The limitations of Example 3, wherein the first allocation speed is determined using an exponential moving average (EMA) of historical allocation speeds for the first storage pool.

Example 5: The limitations of any one of Examples 1-4, wherein the method further comprises calculating a first updated estimated time to storage fullness for the first migration source storage pool, determining that the first updated estimated time to storage fullness exceeds a migration back time threshold, and in response to the first updated estimated time to storage fullness exceeding the migration back time threshold, returning a migrated storage volume from the first migration target storage pool to the first migration source storage pool.

Example 6: The limitations of any one of Examples 1-5, wherein rebalancing free space in the space balance group causes the first migration source storage pool to have an equal amount of free space as the first migration target storage pool.

Example 7: The limitations of any one of Examples 1-5, wherein rebalancing free space in the space balance group causes the first migration source storage pool to have an equal percentage of free space as the first migration target storage pool.

Example 8: The limitations of any one of Examples 1-5, wherein rebalancing free space in the space balance group causes a first ratio of free space in the first migration source storage pool divided by free space in the first migration target storage pool to equal a second ratio of a first allocation speed of the first migration source storage pool divided by a second allocation speed of the first migration target storage pool.

Example 9: The limitations of any one of Examples 1-5, wherein rebalancing free space in the space balance group causes a first ratio of free space in the first migration source storage pool divided by free space in the first migration target storage pool to equal a second ratio of a first total size of the first migration source storage pool divided by a second total size of the first migration target storage pool.

Example 10: The limitations of any one of Examples 1-9, wherein the method is implemented by a storage controller according to program instructions downloaded to the storage controller from a remote data processing system.

Example 11: The limitations of any one of Examples 1-9, wherein the method is implemented by a remote storage system interfacing with a storage controller via a network.

Example 12: The limitations of any one of Examples 1-3 or 6-11, wherein the allocation speed is determined using an exponential moving average (EMA) of historical allocation speeds for the respective storage pools. And wherein the method further comprises calculating a first updated estimated time to storage fullness for the first migration source storage pool, determining that the first updated estimated time to storage fullness exceeds a migration back time threshold, and returning a migrated storage volume from the first migration target storage pool to the first migration source storage pool.

Example 13: A system comprising a processor and a computer-readable storage medium storing program instructions which, when executed by the processor, are configured to cause the processor to perform a method according to any one of Examples 1-12.

Example 14: A computer program product comprising a computer readable storage medium having program instructions embodied therewith, the program instructions executable by a processor to cause the processor to perform a method according to any one of Examples 1-12.

What is claimed is:

1. A method comprising:
    classifying a first storage pool in a space balance group having a first estimated time to storage fullness below a migration time threshold as a first migration source storage pool;
    classifying a second storage pool in the space balance group having a second estimated time to storage fullness above the migration time threshold as a first migration target storage pool; and
    rebalancing free space in the space balance group by migrating storage volumes from the first migration source storage pool to the first migration target storage pool, wherein a first ratio of free space in the first migration source storage pool divided by free space in the first migration target storage pool equals a second ratio of a first total size of the first migration source storage pool divided by a second total size of the first migration target storage pool as a result of the rebalancing.

2. The method of claim 1, wherein each storage pool comprises a respective plurality of thinly-provisioned storage volumes.

3. The method of claim 1, wherein the first estimated time to storage fullness for the first storage pool is based on a first amount of free space in the first storage pool divided by a first allocation speed of the first storage pool.

4. The method of claim 3, wherein the first allocation speed is determined using an exponential moving average (EMA) of historical allocation speeds for the first storage pool.

5. The method of claim 1, further comprising:
    calculating a first updated estimated time to storage fullness for the first migration source storage pool;
    determining that the first updated estimated time to storage fullness exceeds a migration back time threshold; and
    in response to the first updated estimated time to storage fullness exceeding the migration back time threshold, returning a migrated storage volume from the first migration target storage pool to the first migration source storage pool.

6. The method of claim 1, wherein rebalancing free space in the space balance group causes the first migration source storage pool to have an equal amount of free space as the first migration target storage pool.

7. The method of claim 1, wherein rebalancing free space in the space balance group causes the first migration source storage pool to have an equal percentage of free space as the first migration target storage pool.

8. The method of claim 1, wherein the method is implemented by a storage controller according to program instructions downloaded to the storage controller from a remote data processing system.

9. The method of claim 1, wherein the method is implemented by a remote storage system interfacing with a storage controller via a network.

10. A method comprising:
    classifying a first storage pool in a space balance group having a first estimated time to storage fullness below a migration time threshold as a first migration source storage pool;
    classifying a second storage pool in the space balance group having a second estimated time to storage fullness above the migration time threshold as a first migration target storage pool; and
    rebalancing free space in the space balance group by migrating storage volumes from the first migration source storage pool to the first migration target storage pool, wherein a first ratio of free space in the first migration source storage pool divided by free space in the first migration target storage pool equals a second ratio of a first allocation speed of the first migration source storage pool divided by a second allocation speed of the first migration target storage pool as a result of the rebalancing.

11. The method of claim 10, wherein the first estimated time to storage fullness for the first storage pool is based on a first amount of free space in the first storage pool divided by an allocation speed of the first storage pool, and wherein the allocation speed is determined using an exponential moving average (EMA) of historical allocation speeds for the first storage pool.

12. The method of claim 10, the method further comprising:
    calculating a first updated estimated time to storage fullness for the first migration source storage pool;
    determining that the first updated estimated time to storage fullness exceeds a migration back time threshold; and
    in response to the first updated estimated time to storage fullness exceeding the migration back time threshold, returning a migrated storage volume from the first migration target storage pool to the first migration source storage pool.

13. The method of claim 10, wherein rebalancing free space in the space balance group causes the first migration source storage pool to have an equal amount of free space as the first migration target storage pool.

14. The method of claim 10, wherein rebalancing free space in the space balance group causes the first migration source storage pool to have an equal percentage of free space as the first migration target storage pool.

15. The method of claim 10, wherein the method is implemented by a storage controller according to program instructions downloaded to the storage controller from a remote data processing system.

16. The method of claim 10, wherein the method is implemented by a remote storage system interfacing with a storage controller via a network.

17. A method comprising:
rebalancing free space in a space balance group by migrating storage volumes from a first migration source storage pool to a first migration target storage pool, wherein the first migration source storage pool has a first estimated time to storage fullness below a migration time threshold, wherein the first migration target storage pool has a second estimated time to storage fullness above the migration time threshold, and wherein a first ratio of free space in the first migration source storage pool divided by free space in the first migration target storage pool is equal to a second ratio of a first total size of the first migration source storage pool divided by a second total size of the first migration target storage pool as a result of the rebalancing.

18. The method of claim 17, wherein the first estimated time to storage fullness and the second estimated time to storage fullness are based on an allocation speed that is determined using an exponential moving average (EMA) of historical allocation speeds for the first migration source storage pool and the first migration target storage pool; and
wherein the method further comprises:
calculating a first updated estimated time to storage fullness for the first migration source storage pool;
determining that the first updated estimated time to storage fullness exceeds a migration back time threshold; and
returning a migrated storage volume from the first migration target storage pool to the first migration source storage pool.

19. The method of claim 17, wherein the method is implemented by a storage controller according to program instructions downloaded to the storage controller from a remote data processing system.

20. The method of claim 17, wherein the method is implemented by a remote storage system interfacing with a storage controller via a network.

\* \* \* \* \*